United States Patent
Kim

(10) Patent No.: US 10,619,589 B2
(45) Date of Patent: Apr. 14, 2020

(54) METHOD OF DIAGNOSING NON-COUPLING BREATHER HOSE

(71) Applicants: HYUNDAI MOTOR COMPANY, Seoul (KR); KIA MOTORS CORPORATION, Seoul (KR)

(72) Inventor: Young-Min Kim, Yongin-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/179,202

(22) Filed: Nov. 2, 2018

(65) Prior Publication Data
US 2019/0271277 A1 Sep. 5, 2019

(30) Foreign Application Priority Data

Mar. 5, 2018 (KR) .................. 10-2018-0025940

(51) Int. Cl.
| F02D 41/22 | (2006.01) |
| B60W 50/14 | (2020.01) |
| B60W 40/12 | (2012.01) |
| F02D 41/20 | (2006.01) |

(52) U.S. Cl.
CPC ............. *F02D 41/22* (2013.01); *B60W 40/12* (2013.01); *B60W 50/14* (2013.01); *F02D 41/20* (2013.01); *B60W 2400/00* (2013.01); *B60W 2420/00* (2013.01); *B60W 2510/0638* (2013.01); *B60W 2510/0671* (2013.01); *B60Y 2302/03* (2013.01); *B60Y 2400/303* (2013.01); *B60Y 2400/306* (2013.01); *F02D 2200/02* (2013.01); *F02D 2200/0406* (2013.01); *F02D 2200/101* (2013.01); *F02D 2250/08* (2013.01)

(58) Field of Classification Search
CPC .. F02D 41/22; F02D 41/20; F02D 2200/0406; F02D 2200/02; F02D 2200/101; F02D 2250/08; B60W 40/12; B60W 50/14; B60W 2400/00; B60W 2420/00; B60W 2510/0638; B60W 2510/0671; B60Y 2302/03; B60Y 2400/303; B60Y 2400/306
See application file for complete search history.

(56) References Cited

U.S. PATENT DOCUMENTS 4,724,807 A * 2/1988 Walker .................. F01M 13/04
123/196 A

FOREIGN PATENT DOCUMENTS

| JP | 2011-231754 A | 11/2011 |
| KR | 20-1998-0042270 U | 9/1998 |

* cited by examiner

*Primary Examiner* — Hieu T Vo
(74) *Attorney, Agent, or Firm* — Morgan, Lewis & Bockius LLP

(57) ABSTRACT

A method of diagnosing a non-coupling breather hose includes: sensing a revolutions per minute (RPM) after starting an engine; operating a differential pressure sensor; and determining that a breather hose is not coupled when an output voltage from the differential pressure sensor or a holding time of the output voltage is in a predetermined range.

8 Claims, 7 Drawing Sheets

-PRIOR ART-

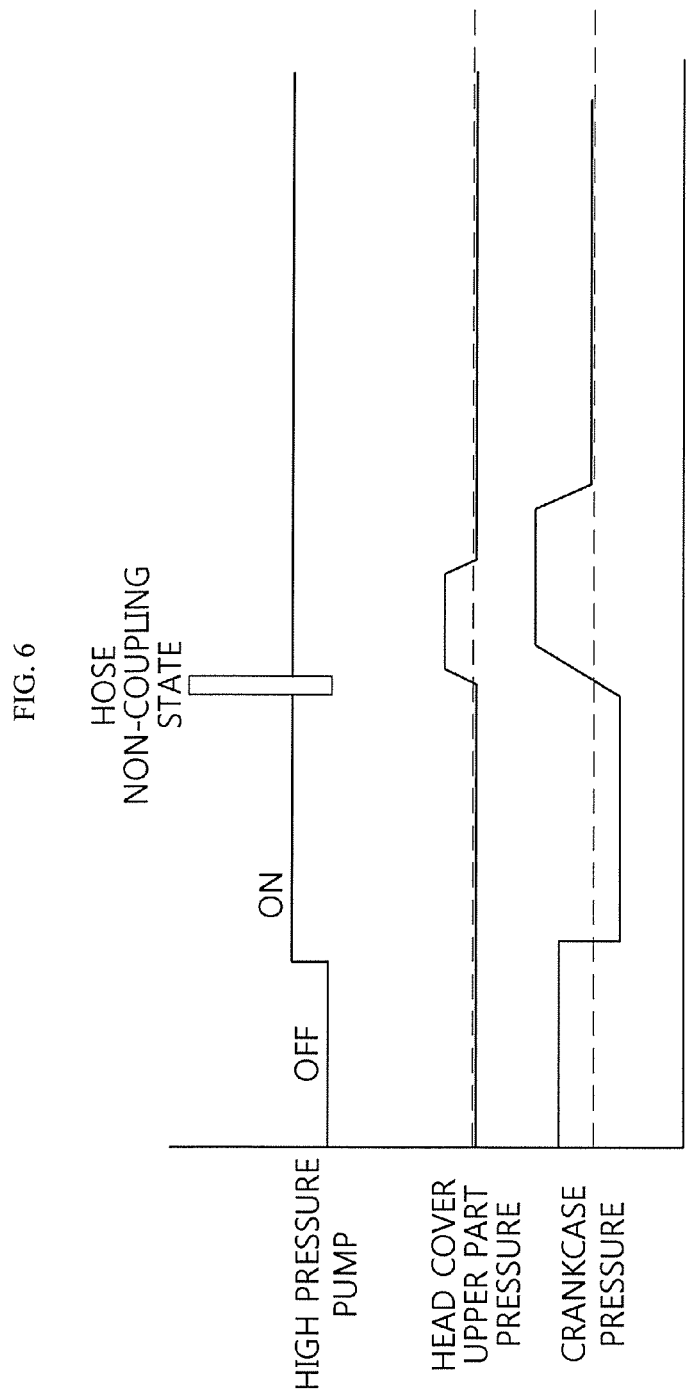

[FIG. 7]
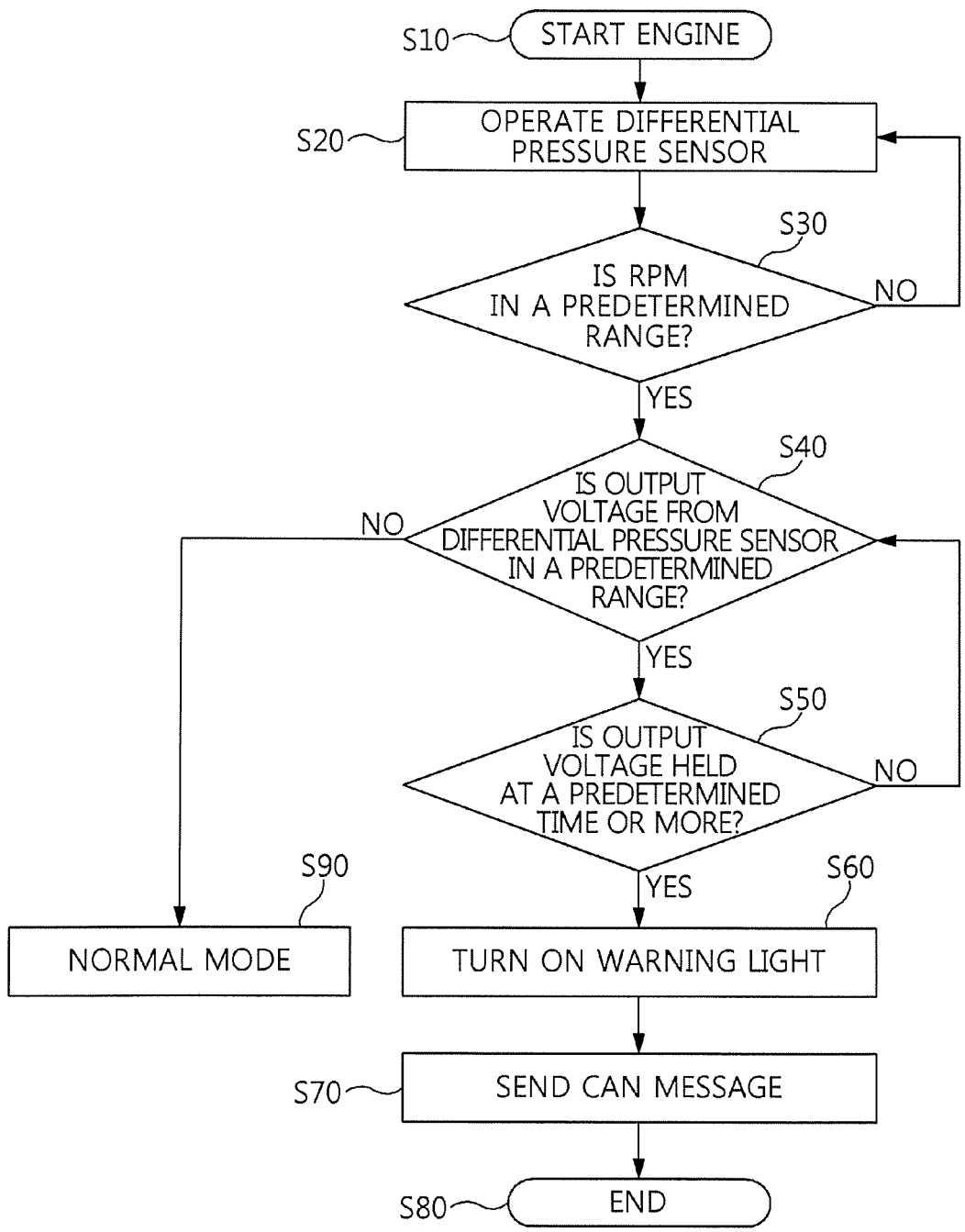

METHOD OF DIAGNOSING NON-COUPLING BREATHER HOSE

CROSS-REFERENCE(S) TO RELATED APPLICATIONS

This application claims priority to Korean Patent Application No. 10-2018-0025940, filed on Mar. 5, 2018, which is incorporated herein by reference in its entirety.

TECHNICAL FIELD

The present disclosure relates to a method of diagnosing a non-coupling breather hose, and more particularly, to a method of diagnosing a non-coupling breather hose in which a pressure change is sensed to determine whether the breather hose is coupled.

BACKGROUND

Generally, an engine is a device that converts thermal energy into a mechanical rotational force by rotating a crankshaft through a connecting rod connected to a piston with explosive power generated by combustion of fuel in a combustion chamber formed between a bore of a cylinder block and the piston reciprocating in a cylinder head and the bore.

In a compression stroke and an explosion stroke of an engine, gas leaked from a gap between a cylinder and a piston to a crankcase contains components such as hydrocarbon and a nitrogen compound which are harmful to a human body. Environmental pollution is caused in a case where the leaked gas is emitted into the atmosphere, therefore emission of blow-by gas such as a fuel-air mixture of combusted gas and non-combusted gas into the atmosphere has been strictly regulated. The blow-by gas indicates gas leaking into a cylinder head or a crankcase while obtaining power by compressing and exploding fuel in a combustion chamber.

For this reason, the blow-by gas which is leaked from the cylinder into the crankcase is recirculated to an intake system, supplied to the cylinder along with an intake, and is emitted into the atmosphere through an exhaust emission control device of an exhaust system.

Accordingly, the blow-by gas flows into the combustion chamber, thereby re-combusted.

FIG. 1 is a perspective view illustrating a breather hose of an engine in the related art.

Referring to FIG. 1, a breather hose 52 that sends blow-by gas leaking into a rocker cover 50 to an intake manifold 51 again to flow in the combustion chamber is illustrated.

The breather hose 52 serves to prevent air pollution due to the emission of the blow-by gas into the atmosphere by supplying the blow-by gas leaking into the cylinder head again through the intake manifold 51 to the combustion chamber, as described above.

Such an exhaust gas circulating system of a diesel engine increases a temperature of an intake by mixing external air taken into the intake system and the circulated blow-by gas in the exhaust system, thus the system can improve engine efficiencies and an emission problem.

Meanwhile, in a case where non-coupling or burning of the breather hose occurs, air pollution is caused due to the emission of the blow-by gas into the atmosphere, therefore a diagnostic device and a diagnostic method of a non-coupling breather hose have been required.

SUMMARY

An exemplary embodiment of the present disclosure is to provide a method of diagnosing a non-coupling breather hose capable of improving an accurate diagnostic of whether a breather hose is coupled.

According to an aspect of the present disclosure, a method of diagnosing a non-coupling breather hose, includes: sensing a revolutions per minute (RPM) after starting an engine; operating a differential pressure sensor; and determining that a breather hose is not coupled when an output voltage from the differential pressure sensor or a holding time of the output voltage is in a predetermined range.

The method can be performed by a processor.

The method of diagnosing a non-coupling breather hose may further include starting the engine; operating the differential pressure sensor; determining whether the RPM of the engine is in the predetermined range; determining whether the output voltage from the differential pressure sensor is in the predetermined range; determining whether the output voltage is held at a predetermined time or more; and turning on a warning light.

In the determining of whether the RPM of the engine is in the predetermined range, in a case where the RPM of the engine is not in the predetermined range, returning to the operating of the differential pressure sensor may be performed.

In the determining of whether the output voltage from the differential pressure sensor is in the predetermined range, in a case where the output voltage from the differential pressure sensor is not in the predetermined range, a normal mode may be operated.

In the determining of whether the output voltage is held at the predetermined time or more, in a case where a holding time of the output voltage is shorter than the predetermined time, returning to the determining of whether the output voltage from the differential pressure sensor is in the predetermined range may be performed.

In the turning on the warning light, when the warning light is turned on, a controlled area network (CAN) message may be sent.

In the determining of whether the RPM of the engine is in the predetermined range, the RPM of the engine may be in a range of about 1,500 RPM to about 3,000 RPM.

In the determining of whether the output voltage from the differential pressure sensor is in the predetermined range, the output voltage from the differential pressure sensor may be in a range of 1 volt or more and less than 3.5 volts.

According to an exemplary embodiment of the present disclosure, a method of diagnosing a non-coupling breather hose provides advantages for preventing air pollution by improving an accurate diagnostic of whether a breather hose is coupled, complying with fuel efficiency regulations, improving cost reduction and marketability, and improving the product quality by turning on a warning light early due to an accurate diagnostic with directly mounted structure system and logic on a head cover.

BRIEF DESCRIPTION OF THE DRAWINGS

FIG. 6 is a schematic diagram illustrating a diagnostic principle on the basis of pressure changes when the breather hose is not coupled.

FIG. 7 is a flowchart illustrating a method of diagnosing a non-coupling breather.

DETAILED DESCRIPTION OF SPECIFIC EMBODIMENTS

Exemplary embodiments to be described below are provided in order for those skilled in the art to easily understand the technical spirit of the present disclosure, and the present disclosure is not limited by these exemplary embodiments. In addition, contents illustrated in the accompanying drawings are provided in order to easily describe exemplary embodiments of the present disclosure, and are different from actually implemented forms.

It is to be understood that when one element is referred to as being "connected to" or "coupled to" another element, it may be connected directly to or coupled directly to another element or be connected to or coupled to another element, having the other element intervening therebetween.

In addition, a term "connection" herein includes a direct connection and an indirect connection between one member and the other member, and means all physical connections such adhesion, attachment, coupling, bonding, fastening, and the like.

In addition, expressions such as "first", "second", and the like, are used only in order to distinguish a plurality of components from one another, and do not limit a sequence between the components and other features of the components.

Singular forms are intended to include plural forms unless the context clearly indicates otherwise. It may be interpreted that terms "include", "have", or the like, means the presence of features, numerals, steps, operations, components, parts mentioned in the present specification, or a combination thereof, but do not preclude the addition of one or more other features, numerals, steps, operations, components, parts, or a combination thereof.

Figure 1:
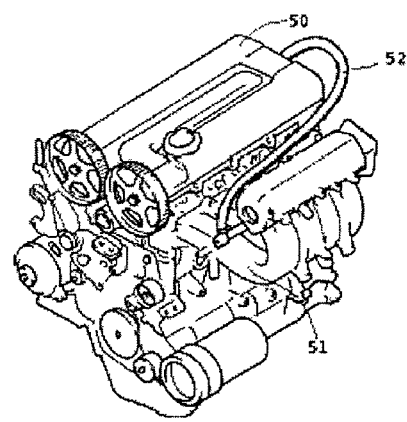
FIG. 1 is a perspective view illustrating a breather hose of an engine in the related art.
Figure 2:
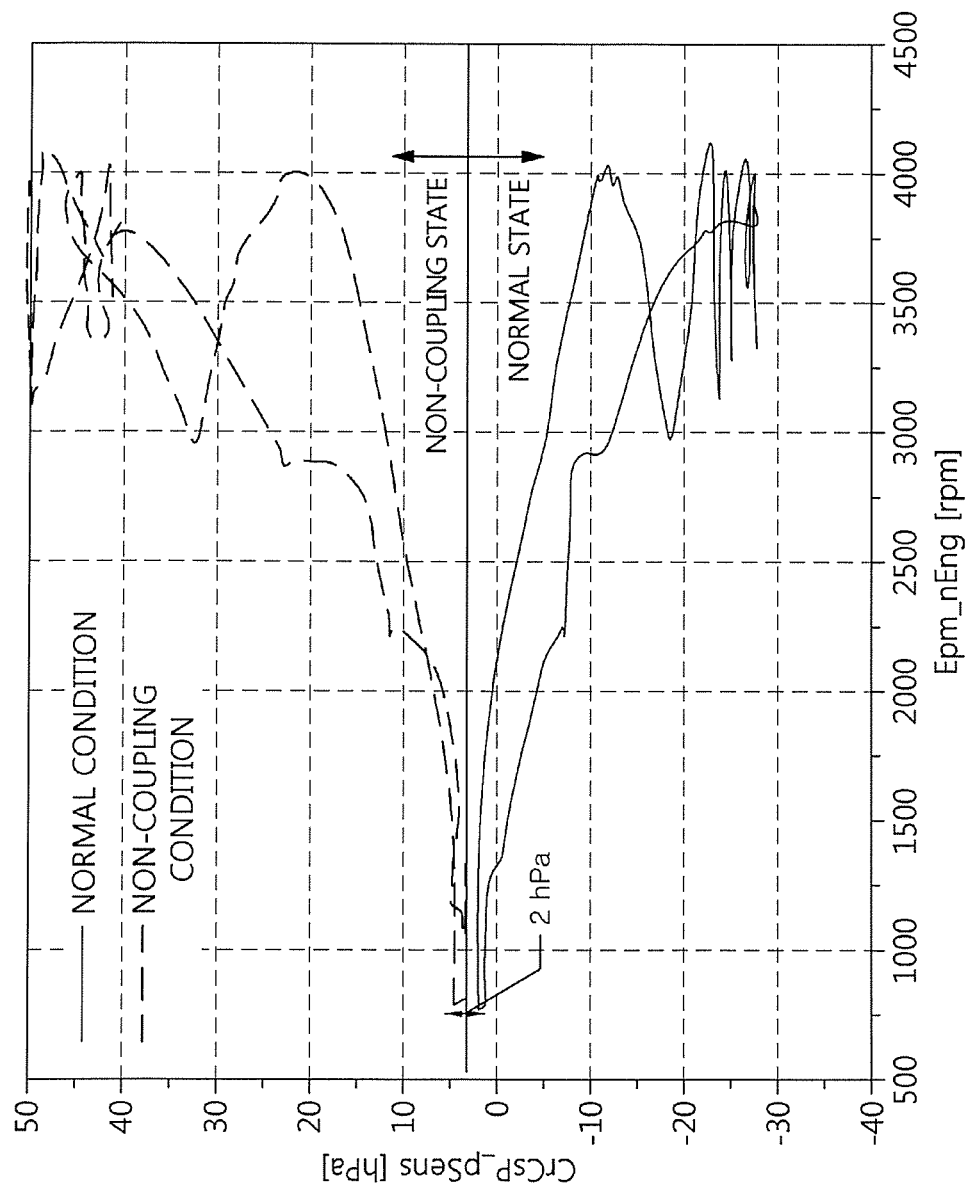
FIG. 2 is a graph illustrating a case where a differential pressure sensor is mounted on a head cover.

FIG. 2 is a graph illustrating a case where a differential pressure sensor is mounted on a head cover.

Referring to FIG. 2, an X-axis represents an rpm, and a Y-axis represents a pressure change. In addition, a solid line represents a normal condition, and a dotted line represents a non-coupling condition.

A breather hose may be formed of steel materials or polyvinyl chloride (PVC) materials. The breather hose formed of the steel material is configured to be threaded on one end thereof, to couple the one end and a transmission housing together, and to cover a free end of the breather hose with a cap. The breather hose formed of the PVC materials is manufactured into a flexible tube, and is configured to couple a nipple and a transmission housing together, to be coupled to the nipple, and to couple the other end thereof to a cap on which a through-hole is formed together.

Such a configuration in the related art, the breather hose manufactured into the steel pipe has no flexibility of a length extension, it is difficult to extend the length of the breather hose, on the contrary, the breather hose manufactured into the flexible tube has a flexibility of a length extension, thus it is possible to extend the length of the breather hose, although the through-hole formed on the cap coupled to the free end of the breather hose serves to exhaust oil mist in the transmission, since the through-hole is directly connected to external air, external dust or foreign substances are easily flowed into oil in the transmission through the breather hose. Nevertheless, in the present disclosure, a breather hose may be formed of polyvinyl chloride (PVC) materials.

According to the present disclosure, in a case where the differential pressure sensor is mounted on the head cover, on the basis of the half of the Y-axis as the reference point, when a pressure increase, the non-coupling state is represented, and when a pressure decrease, the normal state is represented.

The minimum pressure is −27 hPa and the maximum pressure is 50 hPa, thereby excesses the maximum measurable value, the minimum differential pressure of the differential pressure between the normal condition and the non-coupling condition is 2 hPa. That is, the sensitivity of non-coupling hose is 2 hPa.

Figure 3:
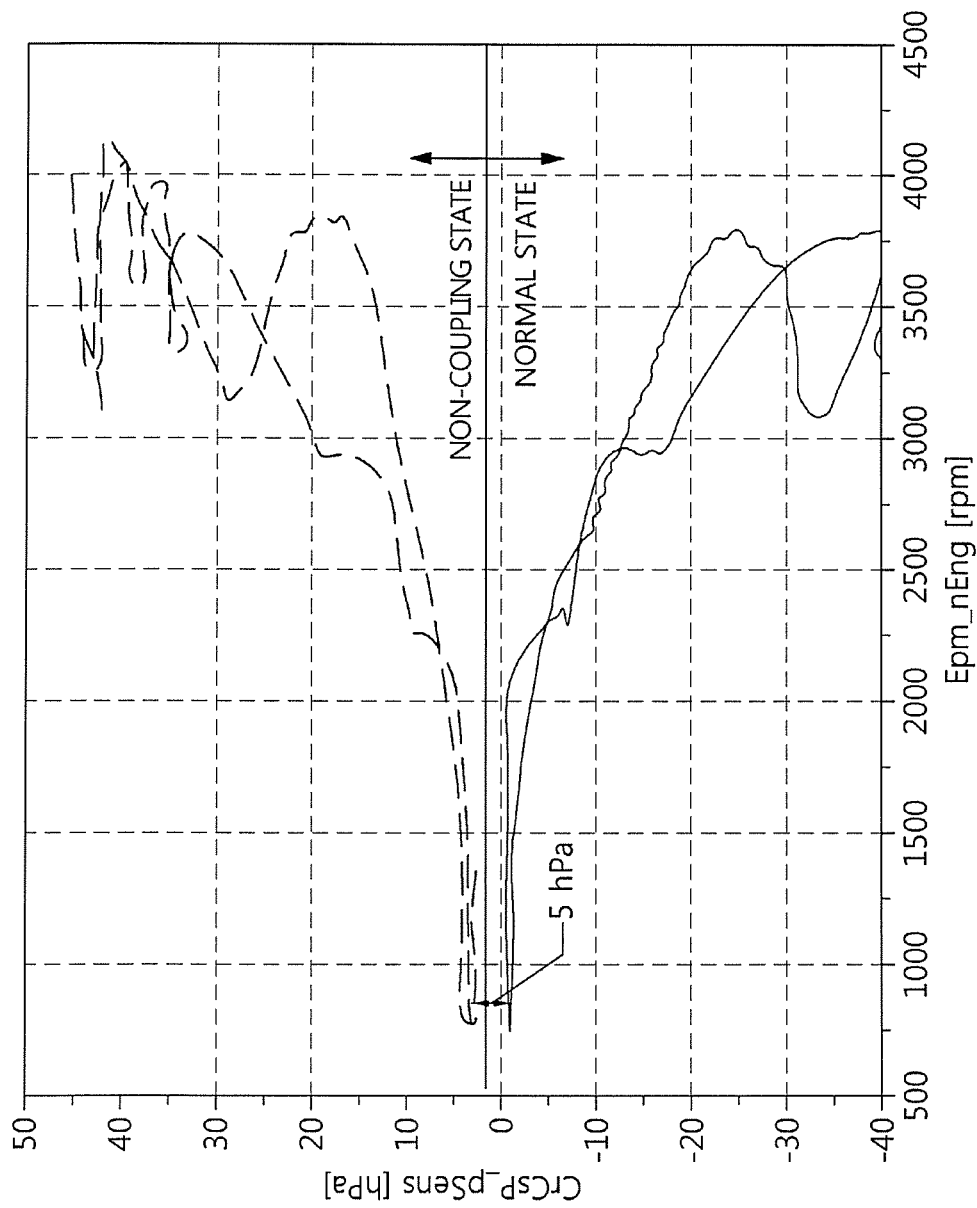
FIG. 3 is a graph illustrating a case where a negative pressure of an intake hose is measured by the differential pressure sensor.

FIG. 3 is a graph illustrating a case where a negative pressure of an intake hose is measured by the differential pressure sensor.

Referring to FIG. 3 compared with FIG. 2, an X-axis represents an rpm, and a Y-axis represents a pressure change. In addition, a solid line represents a normal condition, and a dotted line represents a non-coupling condition.

According to the present disclosure, in the case where the differential pressure sensor is mounted on the head cover, on the basis of the half of the Y-axis as the reference point, when a pressure increase, the non-coupling state is represented, and when a pressure decrease, the normal state is represented.

The minimum pressure is −40 hPa, thereby excesses the minimum measurable value, and the maximum pressure is 45 hPa, thus the minimum differential pressure of the differential pressure between the normal condition and the non-coupling condition is 5 hPa. That is, the sensitivity of non-coupling hose is 5 hPa.

Accordingly, it found that in the case where the differential pressure sensor is mounted on the head cover, the non-coupling hose is more accurately diagnosed compared to the case of measuring a negative pressure of the intake hose.

Figure 4:
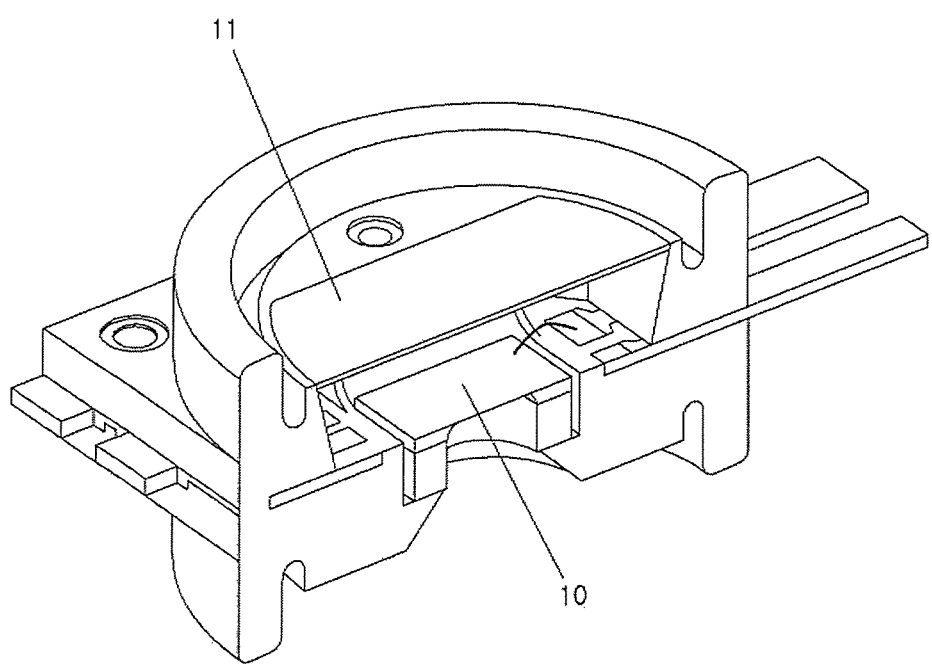
FIG. 4 is a schematic view illustrating a measurement principle of the differential pressure sensor.

FIG. 4 is a schematic view illustrating a measurement principle of the differential pressure sensor.

FIG. 4 illustrates a structure of the differential pressure sensor provided with a protective gel 11 on a sensor chip 10. The differential pressure is measured by sensing a deformation quantity of an evaporating pressure of a lower part of the sensor chip 10 and a diaphragm of the atmosphere of an upper part of the sensor chip 10.

Generally, differential pressure sensor has various types, for example, a diaphragm type, a capacitance type, a piezoelectric type, and an electric-resistance type. The diaphragm differential pressure sensor is configured to include a sensor body with isolation diaphragms on both ends thereof, a center diaphragm separately disposed from an electrode in the sensor body, and an oil tube provided in the sensor body.

When a target pressure is measured by the isolation diaphragm, the pressure acts on the center diaphragm, therefore capacitance is changed. The capacitance change is converted to a pressure signal, thereby measuring the differential pressure.

In a case where low differential sensor is measured by the diaphragm differential pressure sensor having such a configuration, in order to improve measurement precision, the isolation diaphragm is able to be deformed by small pressure. The isolation diaphragm is made to be easily deformed by thinning a thickness thereof or being formed into a wave shape.

Figure 5A:
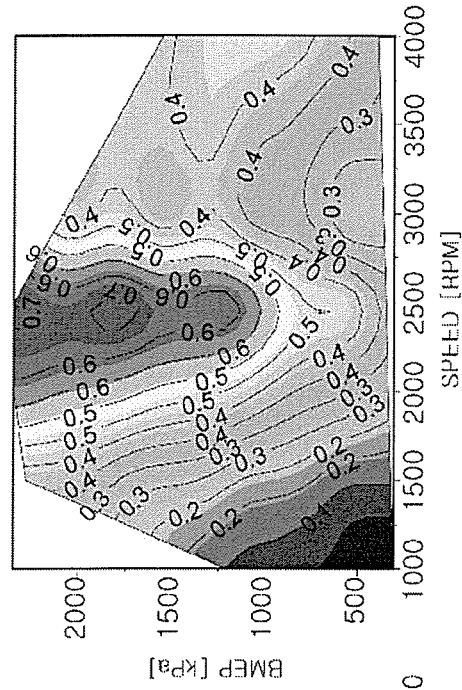
FIGS. 5A to 5C are schematic diagrams illustrating measurement results of a normal state and an abnormal state of the breather hose.
Figure 5B:
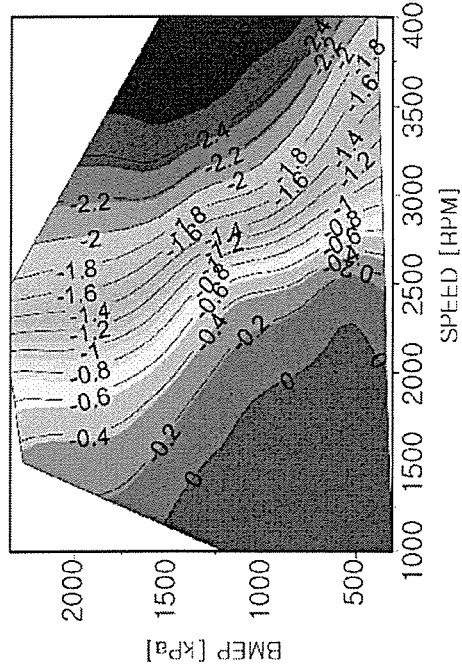
Figure 5C:
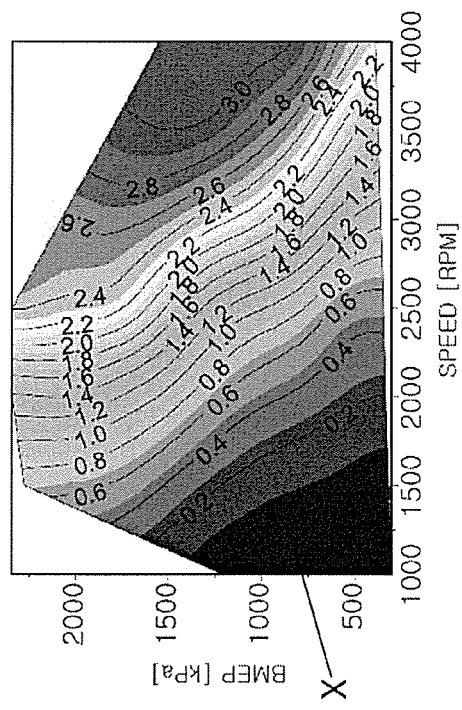

FIGS. 5A to 5C are schematic diagrams illustrating measurement results of a normal state and an abnormal state of the breather hose.

FIGS. 5A to 5C illustrate graphs representing (C) a differential pressure between (A) a normal state and (B) a hose non-coupling state.

An X-axis represents an rpm and a Y-axis represents kpa. Referring to a graph of the differential pressure, a non-coupling hose may be sensed. However, the difference of the differential pressure is small in (X) low speed and load range, and therefore, a sensor having a margin of error of ±0.1 kpa may be mounted.

FIG. 6 is a schematic diagram illustrating a diagnostic principle on the basis of pressure changes when the breather hose is not coupled.

Referring FIG. 6, in a state where a high pressure pump is turned on from turn-off state, in a case where the hose is non-coupled during the operation of the high pressure pump, the pressure of the crankcase returns to the atmospheric pressure after the pressure increase, and the pressure of the upper part of head cover also returns to the atmospheric pressure after the pressure increase.

Therefore, a difference between a boost pressure of a turbo and a pressure of a head cover decreases, the differential pressure sensor senses the difference and then non-coupling hose may be sensed.

FIG. 7 is a flowchart illustrating a method of diagnosing a non-coupling breather.

Referring to FIG. 7, a method of diagnosing a non-coupling breather hose according to an exemplary embodiment of the present disclosure, includes: sensing an RPM after starting an engine; operating a differential pressure sensor; and determining that a breather hose is not coupled, in a case where an output voltage from the differential pressure sensor or a holding time of the output voltage is in a predetermined range.

In a particular example, the method of diagnosing a non-coupling breather hose includes starting the engine (S10), operating the differential pressure sensor (S20), determining whether the RPM of the engine is in the predetermined range (S30), determining whether the output voltage from the differential pressure sensor is in the predetermined range (S40), determining whether the output voltage is held at a predetermined time or more (S50), and turning on a warning light (S60).

Starting of the engine (S10), operating of the differential pressure sensor (S20), and determining of whether the RPM of the engine is in the predetermined range (S30) are performed, herein the RPM of the engine may be in a range of 1,500 RPM to 3,000 RPM. In a case where the RPM is in the predetermined range, determining of whether the output voltage from the differential pressure sensor is in the predetermined range (S40) is performed, in a case where the RPM is not in the predetermined range, returning to the operating of the differential pressure sensor is performed.

Subsequently, the output voltage from the differential pressure sensor is in the predetermined range, the output voltage from the differential pressure sensor is measured, in a case where the output voltage from the differential pressure sensor is not in the predetermined range, a normal mode is operated (S90), in a case where the output voltage from the differential pressure sensor is in the predetermined range, determining of whether the output voltage is held at a predetermined time or more is performed, in a case where the output voltage is not held at the predetermined time or more, returning to the determining of whether the output voltage from the differential pressure sensor is in the predetermined range is performed. Here, the normal mode means that the differential pressure sensor is under normal operation condition. For example, in the normal mode, the differential pressure sensor is operated between −27 hPa and 50 hPa.

In the present disclosure, the method can be performed by a processor (e.g., ECU) which controls various electrical systems including a speed sensor, a pressure sensor, etc. in a vehicle.

Recent vehicle technology are developed focus on user convenience, provision of various services by communicating with other devices other than intrinsic functions of a vehicle, and applied to various electric control systems, for example, an ABS system, an airbag system, a traction control system (TCS), an adaptive front-lighting system (AFS), an adaptive cruise control (VCC), electronic equipment for an advanced vehicle high safety vehicle, telematics, an intelligent transport system (ITS), and the like. For safety and convenience of vehicles, these high-tech systems are more demanded, thus related electronic equipment also may be exponentially increased.

Accordingly, in response to these circumstances, a number of electronic control units (ECU) which are mounted in-vehicle are increased, data communication between the ECUs is performed via a network so-called controller area networks (CAN). Recently, with attempts to provide various services via network communication in vehicles, there are required data confidentiality on data needed to maintain integrity such as data for controlling a vehicle, and data such as personal information of a driver as well.

Recently, tens or hundreds of electronic control units (ECU) performs a control such as braking, accelerating, steering, and charging on electric vehicles which becomes popular. The controller area network (CAN) is a communication protocol for communicating ECUs, which is an in-vehicle communication technology which is applied to most vehicles. In a case where the output voltage is held at the predetermined time or more, turning on of a warning light is performed (S60), the CAN message is sent (S70), and then the operation is finished (S80).

According to an exemplary embodiment of the present disclosure, a method of diagnosing a non-coupling breather hose provides advantages for preventing air pollution by improving an accurate diagnostic of whether a breather hose is coupled, complying with fuel efficiency regulations, improving cost reduction and marketability, and improving the product quality by turning on a warning light early due to an accurate diagnostic with directly mounted structure system and logic on a head cover.

Those skilled in the art will appreciate that various modifications and alterations may be made without departing from the spirit or essential feature of the present disclosure. The foregoing exemplary embodiments are only examples in order for those skilled in the art to easily understand, but the spirit of the present disclosure is not limited to the foregoing exemplary embodiments, and it should be understood that various modifications, additions, and alternations may be made, and equivalent other exemplary embodiments may be made without departing from the spirit of the present disclosure. Although the embodiments have been described above in detail, the scope of the present disclosure will be apparent by claims described later, it should be interpreted that modifications or alternations derived from the scope of claims and equivalents are included in the scope of the present disclosure. In addition, terms and words used in the present specification and claims are not to be construed as a general or dictionary meaning but are to be construed as meaning and concepts meeting the technical ideas of the present disclosure based on a principle that the inventors can appropriately define the concepts of terms in order to describe their own inventions in best mode. Moreover, the configurations described above should not be performed time sequentially, although each of configurations or implemented order is changed, as long as the spirit of the disclosure is satisfied, it is also included in the scope of a right of the present disclosure.

What is claimed is:

1. A method of diagnosing a non-coupling breather hose, comprising:
   starting an engine;
   sensing a Revolutions Per Minute (RPM) of the engine after starting the engine;
   operating a differential pressure sensor;
   determining whether the RPM of the engine is in a predetermined RPM range;
   determining whether an output voltage is in a predetermined voltage range;
   determining whether the output voltage is held at a predetermined time or more;
   determining that a breather hose is not coupled, when the output voltage from the differential pressure sensor or a holding time of the output voltage is in a predetermined range; and
   turning on a warning light when it is determined that the breather hose is not coupled.

2. The method of claim 1, wherein, when the RPM of the engine is not in the predetermined RPM range according to a determination result from the determining whether the RPM of the engine is in a predetermined range, the method returns to the operating a differential pressure sensor.

3. The method of claim 1, wherein, when the output voltage is not in the predetermined voltage range according to a determination result from the determining whether the output voltage is in a predetermined voltage range, a normal mode is operated.

4. The method of claim 1, wherein, when the holding time of the output voltage is shorter than the predetermined time according to a determination result from the determining whether the output voltage is held at a predetermined time or more, the method returns back to the determining whether an output voltage is in a predetermined voltage range.

5. The method of claim 1, wherein, when the warning light is turned on in the turning on a warning light, a controlled area network (CAN) message is sent.

6. The method of claim 1, wherein the predetermined RPM range includes 1,500 RPM to 3,000 RPM.

7. The method of claim 1, wherein, the predetermined voltage range includes 1 volt or more and less than 3.5 volts.

8. The method of claim 1, wherein the method is performed by a processor.

* * * * *